United States Patent [19]

Ballestrazzi et al.

[11] Patent Number: 4,903,460
[45] Date of Patent: Feb. 27, 1990

[54] DEVICE FOR VARYING THE OPENING BETWEEN THE WELDING ELEMENT AND THE COUNTER-WELDING ELEMENT IN PACKAGING MACHINES

[75] Inventors: Aris Ballestrazzi; Lamberto Tassi, both of Savignano Sul Panaro, Italy

[73] Assignee: Sitma-Societa Italiana Macchine Automatiche S.p.A., Italy

[21] Appl. No.: 200,590

[22] Filed: May 31, 1988

[30] Foreign Application Priority Data

Jun. 3, 1987 [IT] Italy ............................... 20772 A/87

[51] Int. Cl.⁴ ...................... B65B 51/30; B65B 9/12; B65B 9/06
[52] U.S. Cl. ...................................... 53/550; 53/373; 156/512
[58] Field of Search ............... 53/550, 552, 373; 156/494, 496, 498, 515

[56] References Cited

U.S. PATENT DOCUMENTS

| | | | |
|---|---|---|---|
| 2,951,325 | 9/1960 | Podlesak et al. | 53/550 X |
| 3,237,371 | 3/1966 | Gerlach | 53/550 X |
| 3,287,199 | 11/1966 | Virta | 53/552 X |
| 4,019,307 | 4/1977 | Balestrazzi | 53/ |
| 4,553,377 | 11/1985 | Klinkel | 53/373 X |
| 4,611,455 | 9/1986 | Aiuola et al. | 53/373 |

Primary Examiner—Horace M. Culver
Attorney, Agent, or Firm—Roylance, Abrams, Berdo & Goodman

[57] ABSTRACT

In machines for the continuous packaging of products inside a film of a plastic material, folded above the products, so as to form a continuous tubular wrapping, a device for changing the opening between the welding element and the counter-welding element permits the operating distance between the welding elements to be changed as a function of the height of the products in course of packaging, thus ensuring the highest packaging speed for both low- and high-thickness products.

10 Claims, 4 Drawing Sheets

DEVICE FOR VARYING THE OPENING BETWEEN THE WELDING ELEMENT AND THE COUNTER-WELDING ELEMENT IN PACKAGING MACHINES

FIELD OF THE INVENTION

The present invention relates to a device for varying the opening between the welding element and the counter-welding element in packaging machines.

BACKGROUND OF THE INVENTION

In the packaging machines for the automatic packaging of products fed in sequence inside a continuous film of a thermoplastic material, e.g., suitably folded above and/or under said products, so that a continuous tubular element is obtained, a device is provided, which comprises a transversal welding element and counter-welding element, such as to realize a set of wrappings which enclose the products inside the thermoplastic material and separate them from one another.

One of such devices is disclosed in Italian patent No. 1,028,456 (corresponding to U.S. Pat. No. 4,019,307), wherein on a car, alternatively movable in the direction of running of the conveyor tape on which products fed above said film of thermoplastic material are positioned, a welding element and a counter-welding element are provided, which constitute the welding unit and are, e.g., of the bar type, positioned on opposite sides relatively to said material, and provided with a vertical reciprocating motion.

Said welding unit, by combining the essentially horizontal movement of the car with the vertical reciprocating motion of the bars, results therefore to move according to a substantially elliptical trajectory relatively to the thermoplastic material which contains the products. The relative distance between the two bars is fixed, independently from the height of the products to be packaged, and from the fact that the counter-welding element too is more or less movable in a vertical direction.

In fact, if on one hand an adjustment can be carried out by modifying the position of the point at which the counter-welding element has its operating top stop point, on the other hand, by so doing, a corresponding shift upwards of the welding bar is determined, because the relative operating distance, or opening, between the two bars in their resting position must remain unchanged, and equal to the factory setting carried out when the packaging machine was manufactured.

Such an arrangement considerably limits the speed of the machine, above all in the presence of limited-height products, because the actual stroke of both bars remains fixed, and has always its maximum value.

SUMMARY OF THE INVENTION

A purpose of the present invention is to provide a device which makes it possible the maximum height of opening of the welding unit to be changed with varying heights of the product to be packaged, so as to make it possible as-high-as-possible packaging speeds to be taken advantage of, with such values of the welding pressure between the welding bar and the counter-welding bar being simultaneously secured, as to optimize at the same time both the cutting and the welding of the thermoplastic material.

These and still other purposes according to the present invention are achieved by providing a device for changing the opening between the welding element and the counter-welding element in packaging machines of the type wherein the products to be packaged are positioned in sequence on a conveyor tape and are wrapped inside a continuous tubular film of a plastic material, comprising a car driven to horizontally reciprocate in the direction of travelling of said conveyor tape, a welding unit composed by a welding element and a counter-welding element borne by said car, positioned on opposite sides relatively to said tubular film, and approachable to each other in order to realize a temporary condition of engagement of welding and cutting of said plastic film interposed between them, and means for locally diverting said conveyor tape in correspondence of said car, so as to prevent it from running across the space comprised between said welding element and said counter-welding element, wherein both said welding element and said counter-welding element of said welding unit can be driven to vertically reciprocate between respective resting and mutual spacing-apart positions and said mutual engagement position, characterized in that between said welding unit, and a drive means supplying a predetermined constant-angle oscillatory motion in order to generate said vertical reciprocating motion, a first adjustment-control means and a second adjustment-control means are provided, for controlling the adjustment of the mutual position of crank means operatively rotatably linked on one side with said oscillatory motion generating means, and, on the other side, with said welding element and counter-welding element of said welding unit.

BRIEF DESCRIPTION OF THE DRAWINGS

The structural and functional characteristics, and the advantages of a device for packaging machines according to the present invention will be better understood from the following disclosure, given for exemplifying and non-limitative purposes, referred to the schematic drawings, wherein.

DETAILED DESCRIPTION OF THE INVENTION

Figure 1:
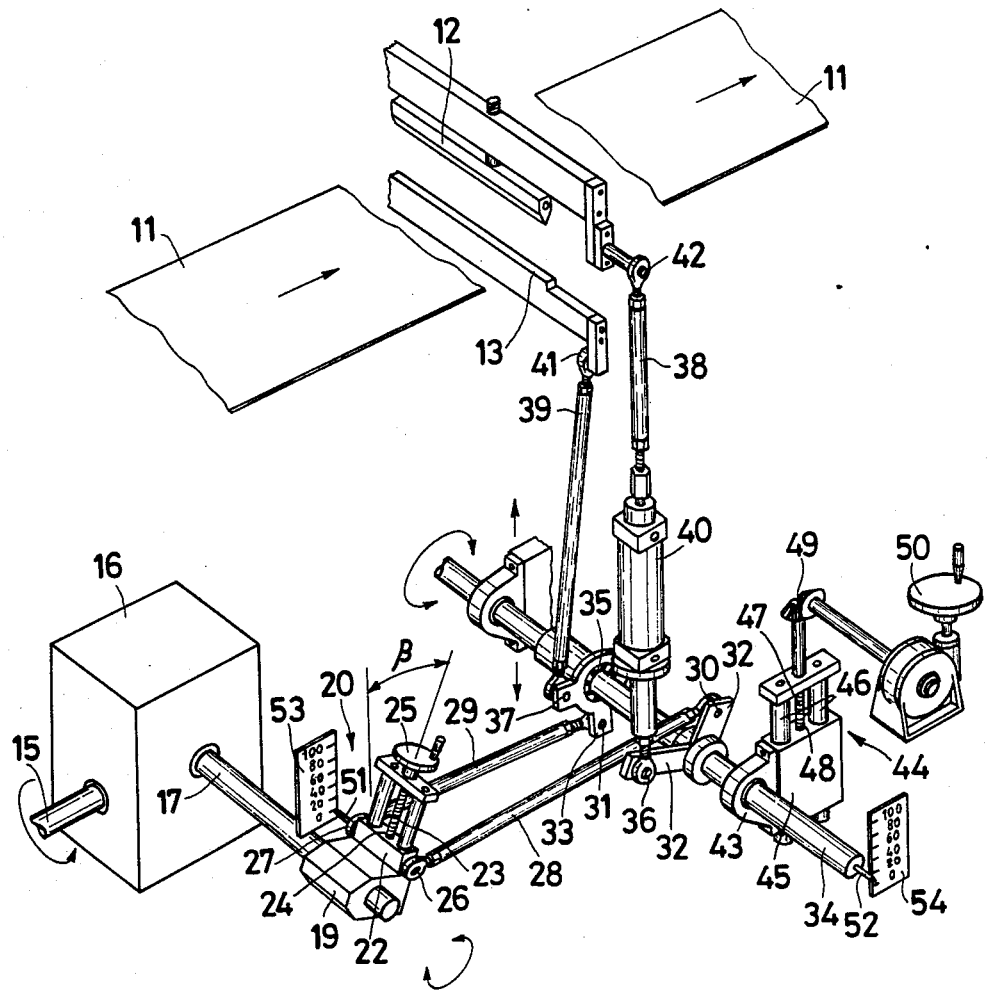
FIG. 1 shows a perspective view of a device according to the present invention, with the welding element and the counter-welding element being in their opened position for a product to be packaged having a minimum height.

In a packaging machine, not shown in the figures, products to be packaged, positioned in sequence after each other at regular distances, and already wrapped inside a continuous film of plastic and/or thermoplastic material in a tubular arrangement, are fed above a conveyor belt, schematically shown in 11, towards a per se known welding unit, essentially constituted by a welding element 12 and a counter-welding element 13.

Said welding unit is of the type wherein the welding element 12 and the counter-welding element 13 are vertically movable by a reciprocating motion, and are borne by a car schematically indicated by the reference numeral 14, which is provided with a substantially horizontal reciprocating motion in a parallel direction to the direction of the conveyor belt 11. In such way, the welding unit can be moved according to an elliptical movement relatively to the product-containing thermoplastic material, so that said motion makes the welding element and the counter-welding element accompany the feeding movement of the conveyor tape while they perform their stroke of mutual approaching. Furthermore, such a movement makes the welding element and the counter-welding element remain into contact, in a temporary position of engagement for a long enough time, so as to secure that the transversal cutting and welding of the interposed film are perfectly carried out, realizing the leading end and the trailing end of the packaged products.

The essentially horizontal reciprocating movement of the car is driven in a known way, and its stroke can be adjusted by means of also well-known control means.

The vertical reciprocating motion of the welding unit is performed inside a vertical guide 10 for said car 14, so that the welding element 12 and the counter-welding element 13 can be driven to move to be shifted between resting, mutual spaced-apart positions and a mutual-engagement position.

In the device according to the present invention, the movement is derived, e.g., from a shaft 15 coupled with the central drive means (not shown in the figures) to revolve according to a continuous revolutionary motion, and driving an oscillatory-motion-generating means, such as a reverser unit 16, from which a shaft 17 protrudes, which is provided with said predetermined, constant-angle oscillatory motion.

A set of three idling rolls 18 are installed in correspondence of the operating area of the welding unit, so that the conveyor belt 11 is diverted in such a way as not to interfere with the welding element 12 and the counter-welding element 13, thus being prevented from running across the space comprised between the welding bar 12 ad the counter-welding bar 13.

A device for changing the height of the opening between the welding element and the counter-welding element according to the present invention is interposed between the welding unit and the shaft 17 provided with oscillatory motion.

In particular, said device is composed by crank means and return shafts, such as to transmit the vertical reciprocating oscillatory motion to the welding unit along a variable stroke with varying heights of the products to be packaged.

On the shaft 17, a support block 19 is key-constrained, which supports a first adjustment-control unit generally indicated by the reference numeral 20.

The first adjustment-control unit 20 comprises a couple of guide studs 21 on which a cross member 22 slides, driven to move by a screw-nut screw coupling constituted by the screw 23 parallel to said guide studs 21, and a nut screw 24 provided inside said cross member 22, with said screw 23 being actuated by means of a handwheel 25 positioned on an upper member, fastened to the guide studs 21 of the same adjustment-control unit 20.

Opposite ends of said cross member 22 bear hinge-pivots 26 and 27, protruding outwards according to the direction of an axis of said cross member 22, which is parallel and eccentric relatively to the axis of revolution of the shaft 17, respectively acting as the end drive for a first rod 28 and for a second rod 29.

At their other end, said first rod 28 and second rod 29 are respectively hinged, in 30 and 31, to a first bell crank 32 and to a second bell crank 33 supported by an intermediate return shaft 34.

The first bell crank 32 is keyed on said intermediate shaft 34, whilst the second bell crank 33 is positioned on said return shaft 34 with the interposition of a freely rotatable support element, which makes it possible for the bell crank 33 and the return shaft 34 to revolve relatively to each other, such as, e.g., a rolling bearing 35.

Onto the respective free ends of the first bell crank 32 and of the second bell crank 33, in 36 and 37 a third rod 38 and a fourth rod 39 are respectively hinged, with said third rod 38 being furthermore provided with an elastic compensation means 40 for the adjustment of the pressure exerted between the welding element 12 and the counter-welding element 13, which are respectively hinged onto said third rod 38—in 42—and onto said fourth rod 39—in 41.

The return shaft 34 is supported in its turn by rotatable-support elements 43 integral with a second adjustment-control unit generally indicated by the reference numeral 44.

The second adjustment-control unit 44 is similar to the first adjustment-control unit 20.

In fact, in an exemplifying form of practical embodiment, it is costituted by a cross member 45, with which said rotatable-support elements 43 are integral, with the cross member 45 being slidingly guided by a couple of guide studs 46 integral with the machine frame. The drive for said cross member 45 to slide is supplied by a screw-nut screw coupling constituted by the screw 47 parallel to said guide studs 46, and a nut screw 48, provided inside said cross member 45.

An end of the shaft provided with said screw 47 is driven to revolve by means of a bevel gearwheel 49 coupling by a hand-operated handwheel 50, which enables the return shaft 34, or, better, both rotatable-support elements 43, to perform their adjustment movements.

Integral with both said cross member 22 of the first adjustment-control unit 20, and directly with the return shaft 34 of the second adjustment-control unit 44, pointer-indicator means 51, 52 are provided, together with relevant indexed scales 53, 54, relating to the translational shift of the cross member 22 and of the return shaft 34 which must be carried out when the product to be packaged has a certain height H.

In the figures, as the heights H of a product to be packaged, values of from 0 to 100 mm are indicated, which values should not be construed as having limiting purposes, but are only exemplifying of the operating way of the device according to the present invention.

The same remark is true for the angle "$\beta$" of oscillation of the shaft 17, which, in the example shown has a predetermined and constant value of approximately 30°, but may have any other advantageous values suitable for supplying the welding unit with the desired reciprocating motion.

The operating way of a device according to the present invention can be easily understood on the basis of an observation of the hereto attached drawings. In fact, for a product to be packaged having a relatively small height, the operator firstly acts, by starting from the position depicted in FIG. 1, on the second adjustment-control unit 44, and revolves the handwheel 50 until the pointer 52 reaches the height of the preselected product to be packaged, as reported on the indexed scale 54.

By so doing, one can observe that, with the intermediate return shaft 34 rising upwards, the first rod 28 causes the same intermediate shaft 34 to revolve in a counterclockwise direction—viewed frontally in FIG. 1—, and, owing to the presence of the first bell crank 32 causes, through the third rod 38, the welding element 12 to shift downwards. Simultaneously, the presence of the second rod 29, of the second bell crank 33 and of the relevant bearing 35, and, finally, of the fourth rod 39, causes, still through a counterclockwise revolution, the counter-welding element 13 to temporarily moved downwards.

The operator acts then in an identical way on the first adjustment-control 20, making the cross member 22 move upwards until the pointer 51 reaches the preselected height on the indexed scale 53. By so doing, the eccentricity of the hinge points 26 and 27 is changed, and the angle is increased, over which they run when the shaft 17 runs over the predetermined and constant angle "$\beta$". The action performed by the first rod 28, the first bell crank 32 and the third rod 38 makes the intermediate return shaft 34 revolve clockwise, and the welding element 12 consequently move upwards. Simultaneously, the presence of the second rod 29, of the second bell crank 33, of the relevant bearing 35 and finally of the fourth rod 39 causes, still by means of a clockwise revolution, the counter-welding element 13 to move upwards.

Figure 2:
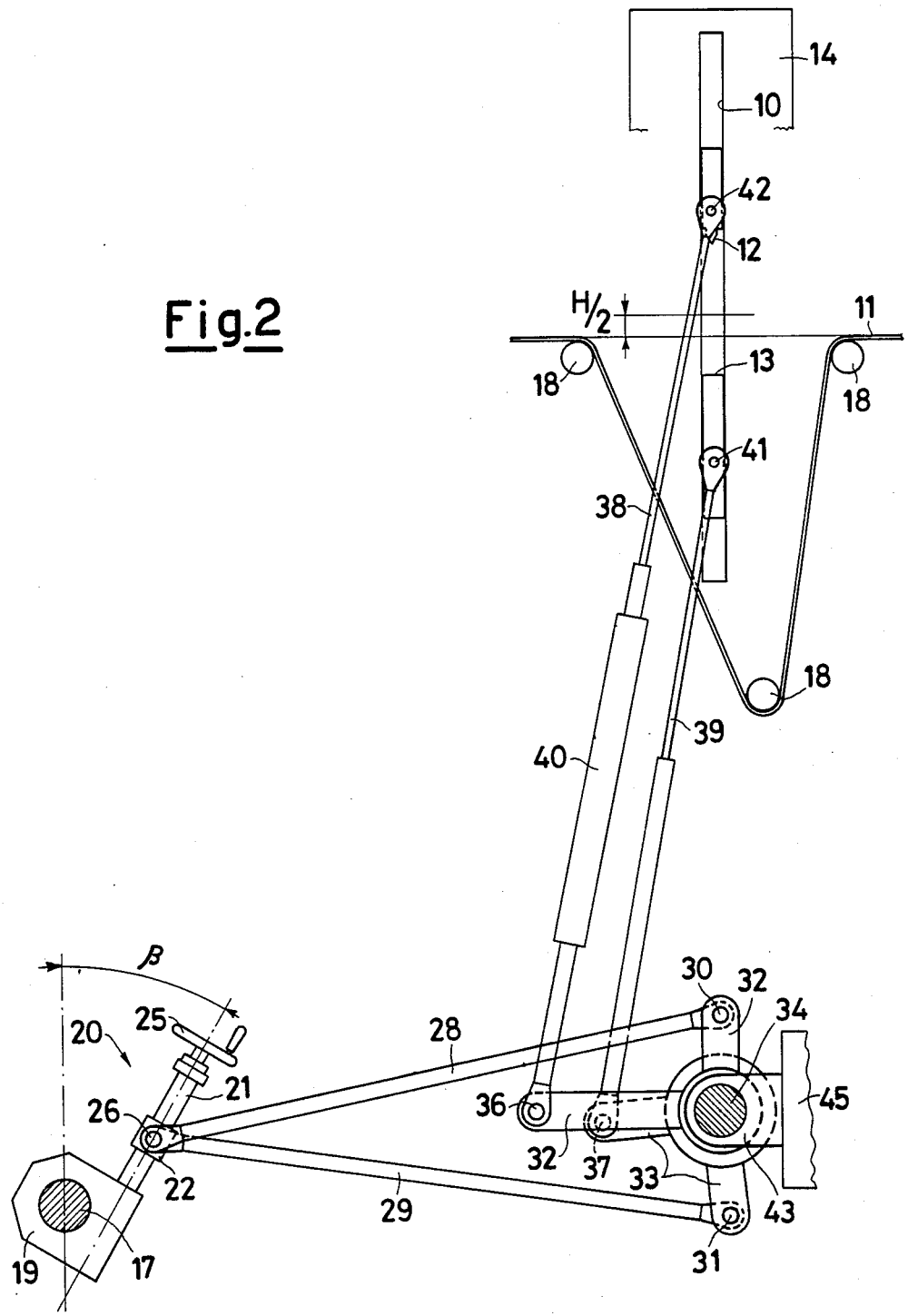
FIG. 2 shows a schematic side view equivalent to that of FIG. 1, with the welding element and the counter-welding element being in their opened position, and with the device being adjusted for handling a product to be packaged having a minimum height.
Figure 3:
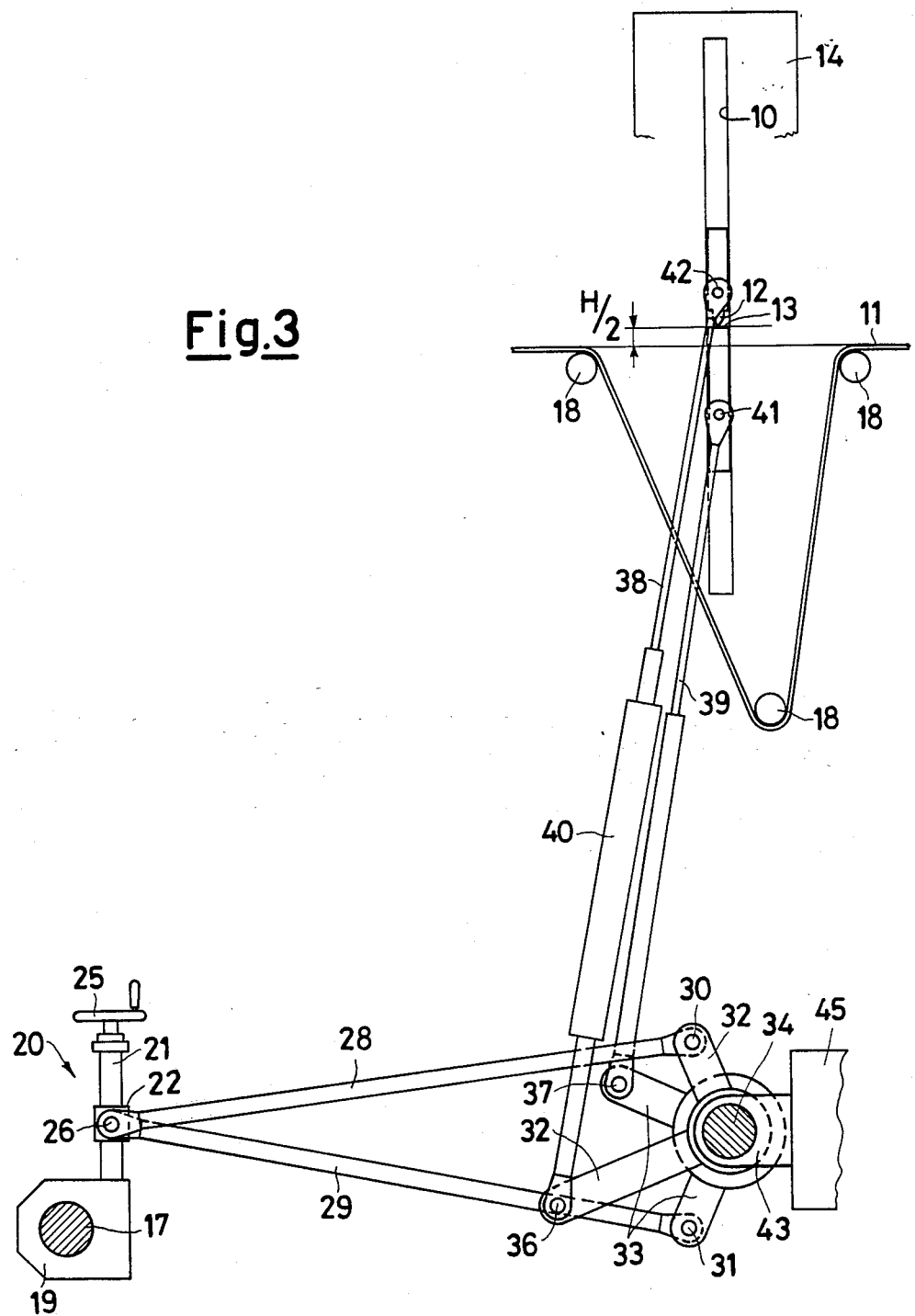
FIG. 3 shows the same view of FIG. 2 in the welding position.

Therefore, the device positions itself as shown in FIG. 2, and the plane of welding and cutting engagement is positioned at a distance of H/2 above the plane of the conveyor belt (see FIG. 3).

Thus, the results has been obtained that the transversal welding is carried out at a height corresponding to half height of the product to be packaged, with the consumption of plastic material being minimized, and an aesthetically pleasant and correctly done package being obtained. At the same time, the result has been obtained that the welding element 12 and the counter-welding element 13 are so positioned as to minimize the time required for said elements to run over their operating stroke, making it possible the packaging machine to run at very high packaging speeds, above all if such speeds are compared to those which could be obtained according to the prior art.

FIG. 2 shows that the lifting and the opening between the welding element and the counter-welding element is reduced to the essential minimum.

Figure 4:
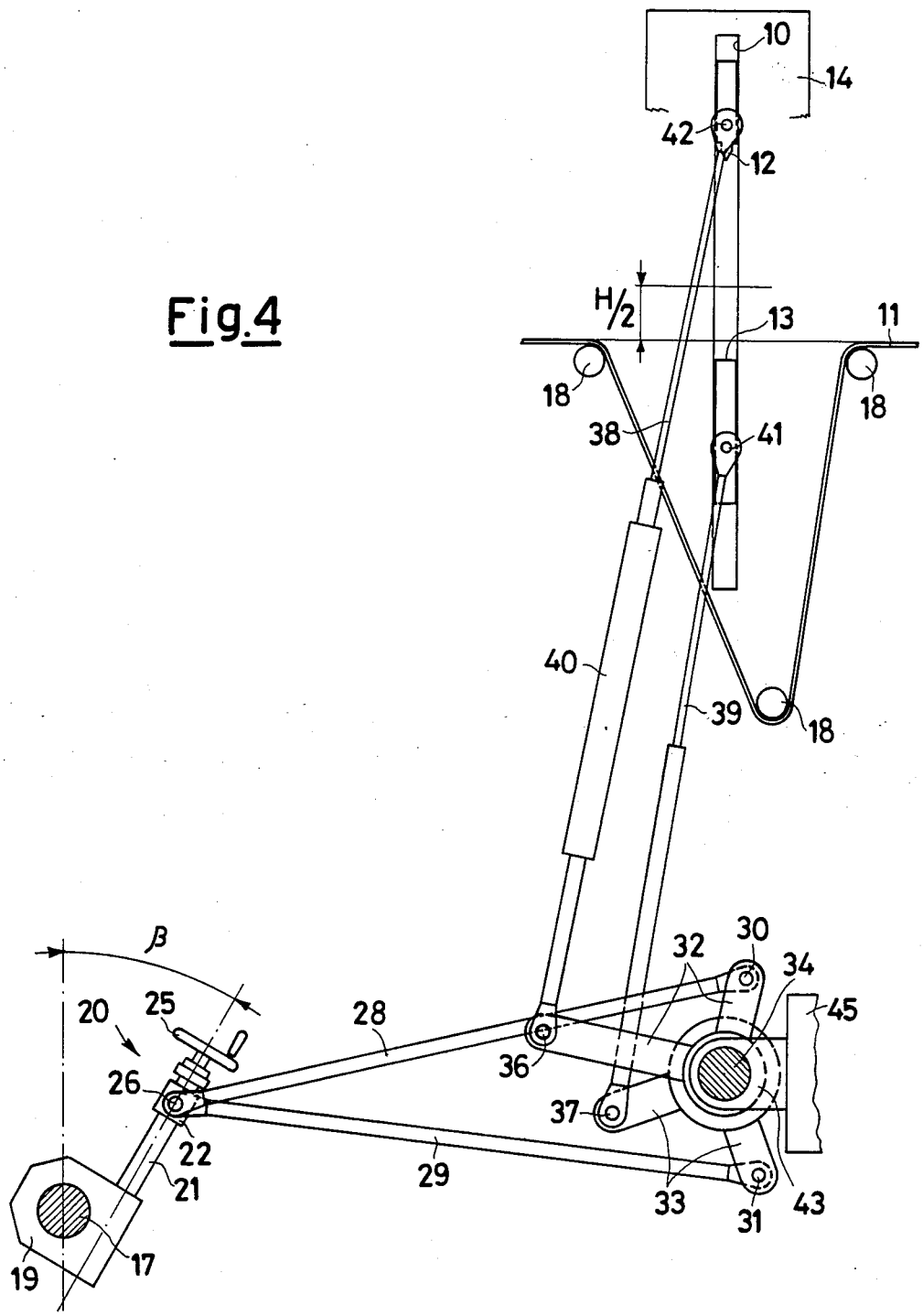
FIG. 4 shows a view equivalent to that of FIG. 2, with the device being adjusted for handling a product having a considerable height.

Then by looking at FIG. 4, one can see that, when the product to be packaged has a rather considerable height, by acting on both adjustment-control units 20 and 44, as hereinabove disclosed, the arc over which the hinge points 26 and 27 run in correspondence of the constant angle "$\beta$", and, consequently, the opening between the welding element and the counter-welding element, is increased, with the results being obtained that, while the packaging treatment of a product of considerable height becomes now possible, at the same time all possible dead times are minimized.

In both cases, both in case of normally low products, and in case of normally high products, the presence of the two adjustment-control units 20 and 44 and of the compensation means 40 keep unaltered the values of pressure between the welding element and the counter-welding element at the different welding heights H and at the different amplitudes of opening between both elements.

Furthermore, one can observe that with increasing heights H of the product to be packaged, the counter-welding element is shifted towards the plane of the conveyor belt 11, whilst the welding element is positioned at a level slightly higher than the maximum height of the product, so as to prevent any interferences with it.

We claim:

1. A welding device for a packaging machine which packages products arranged in sequence on a conveyor belt in a continuous tubular plastic film, the device comprising:

a car supported for horizontal reciprocation parallel to a running direction of the conveyor belt;

a welding unit including a main welding element and a counter welding element supported by said car and positioned on opposite sides of the tubular plastic film, said welding elements being vertically moveable relative to each other between a rest position in which said welding elements are spaced apart and an engagement position in which said welding elements engage for welding and cutting the tubular plastic film interposed between said welding elements;

drive means, supplying a predetermined constant angle oscillatory motion, for powering vertical reciprocation of said welding elements between said rest and engagement positions; and first adjustment control means and second adjustment control means, between said welding unit and said drives means, for varying distances traveled by said welding elements between said rest position and said engagement position for different package heights, said adjustment control means including adjustable crank means, said crank means being operatively and rotatably linked with said drive means on one side thereof and said welding elements on an opposite side thereof.

2. A welding device according to claim 1 wherein said first adjustment control means is positioned adjacent said drive means and comprises link elements eccentrically and adjustably hinged to said drive means to vary eccentric positioning of said link elements relative to said drive means, said link elements being coupled to said crank means; and said second adjustment control means comprises an intermediate return shaft for rods pivotally coupled to said first adjustment control means and said welding elements.

3. A welding device according to claim 1 wherein said drive means comprises a reverser unit with a shaft protruding from said reverser unit.

4. A welding device according to claim 1 wherein each of said first and second adjustment control means comprise guide studs, a cross member slideably guided by said guide studs, said cross member of said first adjustment control means supporting rotatable link elements coupling said crank means and said drive means, and screw and nut coupling means for driving said cross member relative to said guide studs.

5. A welding device according to claim 4 wherein said adjustment control means comprise at least one pointer and an indexed scale associated therewith.

6. A welding device according to claim 1 wherein said crank means comprises
   first and second rods having first ends thereof pivoted to said drive means with said first adjustment control means being between said drive means and said first ends,
   first and second bell cranks mounted on a return shaft with opposite second ends of said first and second rods pivotally coupled to said first and second bell cranks, respectively, and
   third and fourth rods having first ends thereof pivotally coupled to said first and second bell cranks, respectively, and opposite second ends thereof pivotally coupled to said main and counter welding elements, respectively; and
   said return shaft is rotatably supported on said second adjustment control means.

7. A welding device according to claim 6 wherein said second bell crank is freely rotatably mounted on said return shaft by support means.

8. A welding device according to claim 7 wherein said first bell crank is fixed for simultaneously rotation on said return shaft.

9. A welding device according to claim 6 wherein said third rod comprises compensation means for providing pressure between said welding elements.

10. A welding device according to claim 1 wherein means locally diverts the conveyor belt in correspondence of said car for preventing the belt from running across a space between said welding elements.

* * * * *